Oct. 26, 1971  W. T. WICKHAM ET AL  3,614,861
MOWER BLADE AND METHOD OF MAKING SAME
Filed May 26, 1969  2 Sheets-Sheet 1
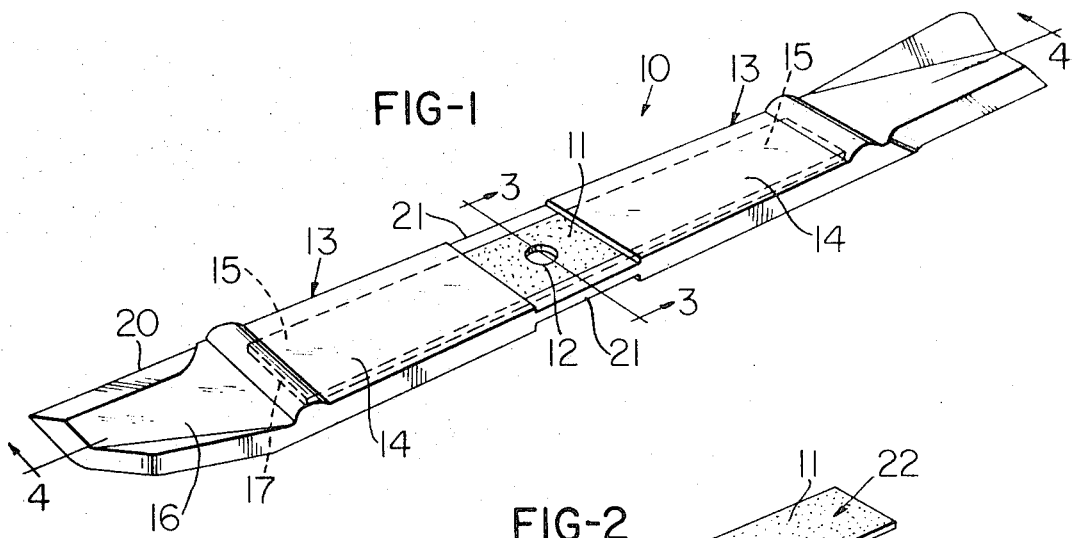
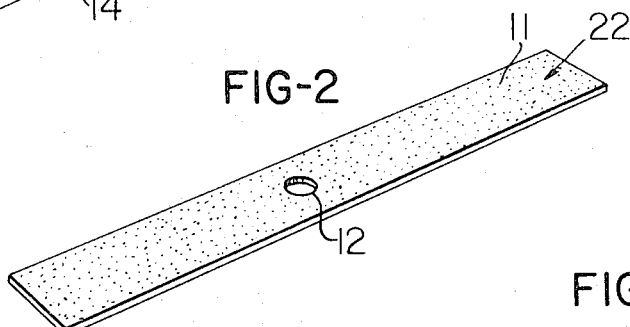
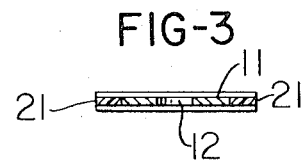
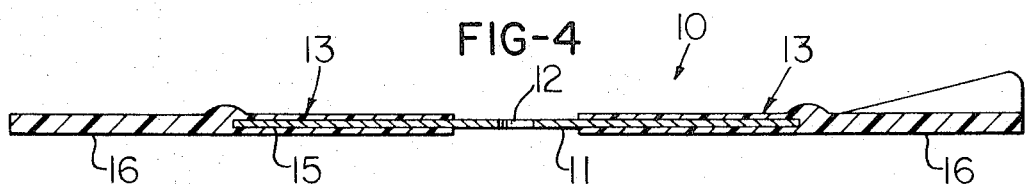
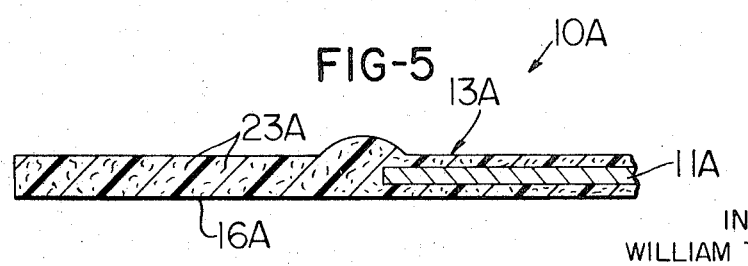
INVENTORS
WILLIAM T. WICKHAM
LELAND E. WILLIAMS
DOYLE V. HAREN
ROBERT W. BUCHANAN
BY Reuben Wolk
ATTORNEY

FIG-6

PROVIDING A MOLD FOR INJECTION MOLDING A LAWN MOWER BLADE

↓

PREHEATING A CENTRAL MOUNTING MEMBER WHICH COMPRISES THE BLADE TO A CONTROLLED TEMPERATURE GREATER THAN THE MOLD TEMPERATURE

↓

POSITIONING THE MOUNTING MEMBER IN A MOLD CAVITY PROVIDED IN THE MOLD

↓

INJECTING AN ELASTOMERIC MATERIAL INTO THE MOLD CAVITY AND AROUND THE MEMBER TO DEFINE ARMS FOR THE BLADE WITH EACH ARM HAVING AN INTEGRAL CUTTING EDGE

↓

CURING THE ELASTOMERIC MATERIAL TO DEFINE A COMPLETED BLADE

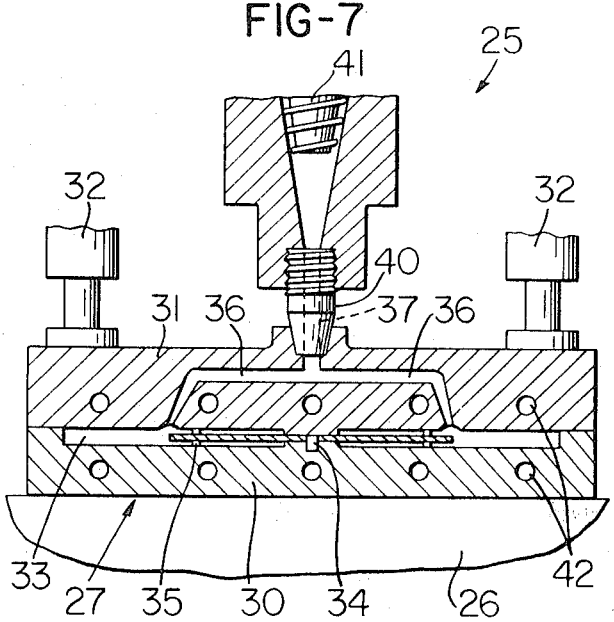

INVENTORS
WILLIAM T. WICKHAM
LELAND E. WILLIAMS
DOYLE V. HAREN
ROBERT W. BUCHANAN

BY Reuben Wolk
ATTORNEY

United States Patent Office 3,614,861
Patented Oct. 26, 1971

3,614,861
MOWER BLADE AND METHOD OF
MAKING SAME
William T. Wickham and Leland E. Williams, Waynesville, Doyle V. Haren, Clyde, and Robert W. Buchanan, Waynesville, N.C., assignors to Dayco Corporation, Dayton, Ohio
Filed May 26, 1969, Ser. No. 827,587
Int. Cl. A01d 55/18
U.S. Cl. 56—295                                3 Claims

ABSTRACT OF THE DISCLOSURE

A lawn mower blade having a central mounting member and outwardly extending arms of improved strength and comprised of an elastomeric material bonded to the mounting member in an optimum manner, with each arm having a flexible outer portion provided with an integral cutting edge, and a method of making such a blade.

BACKGROUND OF THE INVENTION

It has been previously proposed to provide lawn mower blades each having a mounting plate provided with a pair of outwardly extending arms made of a flexible elastomer and bonded to the plate, with each arm having an integral cutting edge whereby such blades are much safer than all-metal blades of conventional construction for reasons which are well known in the art. However, even though conventional all-metal blades are more dangerous, they are still widely used because they comparatively inexpensive to produce. Therefore, to assure that the comparatively safer lawn mower blades which have portions comprised of an elastomeric material will be more widely used it is important that such blades be provided so that the portions thereof made using the elastomeric material have high strength and that such blades retain their inherent safe characteristics and are produced with optimum economy.

SUMMARY

This invention provides a lawn mower blade having a central mounting member and outwardly extending arms of improved strength and comprised of an elastomeric material bonded to the mounting member in an optimum manner with each arm being provided with a flexible outer portion having an integral cutting edge which has comparatively little tendency to become dull. This invention also provides an improved method of making such a lawn mower blade with optimum economy.

Other details, uses, and advantages of this invention will become apparent as the following description of the embodiments thereof presented in the accompanying drawings proceeds.

BRIEF DESCRIPTION OF THE DRAWINGS

The accompanying drawings show present exemplary embodiments of this invention, in which FIG. 1 is a perspective view of an exemplary lawn mower blade of this invention;

FIG. 2 is a perspective view of a central mounting member comprising the blade of FIG. 1;

FIG. 3 is a cross-sectional view taken on the line 3—3 of FIG. 1;

FIG. 4 is a cross-sectional view taken on the line 4—4 of FIG. 1;

FIG. 5 is a fragmentary cross-sectional view illustrating a modified form of the blade of FIG. 1;

FIG. 6 is a block diagram presenting certain method steps which may be used to make the exemplary blade of FIG. 1; and FIG. 7 is a fragmentary cross-sectional view illustrating certain portions of an injection molding apparatus which may be utilized to carry out certain ones of the method steps set forth in FIG. 6.

DESCRIPTION OF ILLUSTRATED EMBODIMENTS

Reference is now made to FIGS. 1–4 of the drawings which illustrate one exemplary embodiment of a lawn mower blade 10 of this invention. The blade 10 is particularly adapted to be mounted on an associated shaft of a lawn mower which is commonly referred to as a rotary mower and the shaft and balde 10 may be rotated by either a gasoline or electric motor and in a manner well known in the art, so that the blade 10 is rotated in a substantially horizontal plane.

The blade 10 comprises a central mounting member 11 which has a central opening 12 extending therein which is adapted to receive the shaft of an associated lawn mower therethrough to enable mounting the blade 10 on such shaft in a known manner. The blade 10 has a pair of oppositely arranged outwardly extending arms 13 made of an elastomeric material and preferably made of polyurethane.

Each arm 13 has an inner or base portion 14 injection molded around an associated end portion 15 of the mounting member 11 and a flexible outer portion 16 which extends beyond an associated end 17 of the mounting member 11 and the flexible outer portion 16 has a cutting edge 20 provided as an integral part thereof. To assure that the flexible outer portion 16 has the desired characteristics the polyurethane preferably has a torsional modulus ranging roughly between $5 \times 10^3$ and $5 \times 10^4$ p.s.i. (ASTM D1043).

As seen particularly in FIGS. 1 and 3 of the drawings the arms 13 may have their inner end portions suitably interconnected by a pair of oppositely arranged integral strips 21 of substantially rectangular cross-sectional configuration. The interconnecting strips 21 may be formed simultaneously with the formation of the outwardly extending arms 13.

The member 11 may be made of any suitable material such as a material containing metal; however, it will be appreciated that any suitable substantially rigid material, such as a hard plastic material, may be utilized to define such member. The member 11 has means comprising the surface thereof which provides a better bond between such member and the injection molded polyurethane utilized to define the arms 13.

The member 11 of this example will be described as being made of a suitable metal and is provided with a roughened outside surface indicated by a granular showing 22. The roughened surface 22 provides a greater surface area which is exposed to the polyurethane and thereby provides an improved bond between the member 11 and the injection molded polyurethane defining the arms 13. The member 11 may also have its outside surface treated with a suitable coating, solution, or the like, to provide a better adhesive bond between such member and the polyurethane injection molded thereagainst.

Thus, it is seen that the blade 10 is provided with a mounting member 11 which has its outside surface suitably conditioned either by suitably roughened or treating such surface to assure the provision of a better bond between the member 11 and the polyurethane injection molded thereagainst. Further, by manufacturing blade 10 by injection molding techniques, to be described subsequently, the blade may be produced in an economical manner while assuring the provision of an inherently safe blade.

Reference is now made to FIG. 5 of the drawings which illustrates another exemplary embodiment of a blade of this invention. The blade illustrated in FIG. 5 is very similar to the blade 10; therefore, such blade will be designated generally by the reference numeral 10A and parts of the blade 10A which are very similar to corresponding parts of the blade 10 will be designated by the same reference numeral as in the blade 10 also followed by the letter designation A and not described again. Only those parts of the blade 10A which are substantially different from corresponding parts of the blade 10 will be designated by a new reference numeral also followed by the letter designation A and described in detail. The main difference between the blade 10A and the blade 10 is that the blade 10A utilizes small particles of an inorganic material dispersed throughout the polyurethane and a representative few of such particles are designated by the reference numeral 23A.

It is important that the cutting edge of the flexible outer portion of each blade retain its sharpness for a maximum period of time while being provided as an integral part of a flexible elastomeric material. It has been found that by providing particles of an inorganic material such as chopped fiber glass dispersed throughout the polyurethane, the cutting edge 20A of each blade 10A has a lesser tendency to dull. In particular, it has been found that fiber glass uniformly dispersed throughout each arm 13A so as to comprise rought 5% to 25% of the total weight of the arm 13 provides the best results.

The exemplary blade 10 may be formed utilizing a technique or method essentially as presented in FIG. 6 of the drawings and such technique may also utilize mold means comprising an injection molding apparatus 25, a fragmentary portion of which is illustrated in FIG. 7 of the drawings. The apparatus 25 comprises a supporting base 26 which suitably supports a mold assembly 27 comprised of a lower mold member 30 and an upper member 31 with the member 31 being suitably keyed in position with respect to the member 30 and clamped firmly in position by a plurality of clamping devices 32 capable of exerting controlled high clamping pressures as high as 25,000 pounds, or more, to hold the members 30 and 31 together.

The members 30 and 31 cooperate to define cavity means shown as a mold cavity 33 which defines the configuration of the elastomeric material comprising the blade 10. The mold assembly 27 has a locating pin 34 suitably supported between the members 30 and 31 and adapted to be inserted through the opening 12 in the mounting member 11 to precisely locate such member within the mold assembly 27. The assembly 27 also has a plurality of supporting pins 35 each extending from an associated member 30 or 31 and the pins 35 are utilized in supporting the mounting member 11 adjacent the outer end portions thereof.

The upper member 31 has internal passages or sprues shown as a pair of internal passage 36 and the sprues communicate with a supply passage 37 provided in a nozzle assembly 40 to enable injecting an elastomeric material into the cavity 33 at a controlled temperature and pressure so as to define the arms 13 comprising the blade 10. The nozzle assembly 40 may be supplied with an elastomeric material using any suitable technique and in this example of the invention the nozzle assembly is supplied by a feed screw 41.

To assure the provision of a high quality blade 10 it is desirable that an optimum bond be provided between the central mounting member 11 comprising blade 10 and the elastomeric material, preferably polyurethane, utilized to form each arm 13 with its flexible outer portion 16. It has been found that each arm 13 is bonded to the mounting member 11 in an optimum manner by first preheating member 11 to a temperature which is greater than the temperature of the mold assembly 27. The preheated member 11 is then supported in position between associated supporting pins 35 in the mold cavity 33 with the locating pin 34 being inserted through opening 12 in member 11 whereupon an elastomeric material such as polyurethane is injected into the mold assembly 27 and around the member 11 at a controlled temperature and pressure. The polyurethane is then suitably cured in the assembly 27 in a known manner and a cooling fluid may also be circulated through openings 42 provided in the members 30 and 31, utilizing any suitable circulating technique, to define the completed blade 10.

It has been found by tests that optimum results are obtained when the mold assembly 27 is kept at a temperature ranging roughly between 50° and 80° F. and the central member 11 is preheated to a temperature ranging roughly between 350° and 410° F. Thus, an optimum bond is provided between the polyurethane and the mounting member 11 when the temperature of the member 11 is between roughly 270° and 360° F. greater than the temperature of the mold assembly 27.

The utilization of injection molding techniques enables the production of blades 10 in mass production quantities and at minimum costs. In particular, polyurethane may be injected into the mold cavity 33 at high pressures which in one application of this invention range from roughly 12,000 to 16,000 pounds whereby the polyurethane may be easily injected into the cavity 33 within a time period of a few seconds ranging between roughly 4 seconds and 13 seconds. The curing may also be achieved in a minimum of time and for typical lawn mower blades ranging in length from 18 inches to 22 inches the curing may be easily achieved within less than a minute with typical times ranging between roughly ½ and ¾ of a minute.

As previously suggested it is desirable that an optimum bond be provided between the member 11 and the polyurethane comprising the arms 13. In the case of a metal member 11, for example, the exposed surface thereof may be treated with an acrylic epoxy to improve the adhesive character of the bond. Mechanical gripping means may also be provided on the surface of member 11 by roughening the exposed surface of the member 11 and such roughening may be provided using any suitable technique such as abrasive grinding, sandblasting, or similar techniques. The roughened surface of member 11, in effect, provides a greater surface area which is contacted by the polyurethane to provide the improved bond between the member 11 and such polyurethane.

Thus, it is seen that providing a mounting member 11 which has a surface which assures a better bond between such member and an associated elastomeric material and preheating such member to a temperature substantially greater than the temperature of an associated mold assembly prior to injection molding the arms 13 in position assures the provision of blade 10 having improved structural characteristics. Further, the cost of blade 10 is sufficiently low that it competes favorably with all-metal blades in current use.

As previously indicated, each arm 13 of the blade 10 may be provided with a greater strength at minimum cost by utilizing an inorganic material which is dispersed substantially uniformly throughout the polyurethane. Satisfactory results have been obtained utilizing chopped fiber glass, as mentioned earlier; however, other suitable chopped fibers may be utilized as well as finely dispersed silica where the weight of the inorganic material comprises between roughly 5 percent and 30 percent of the total weight of each arm 13.

In this example of the invention the member 11 has been described as having its outer surface roughened to increase the surface area thereof and provide a better bond between such member and the injection molded polyurethane. However, it will be appreciated that other techniques may be utilized to increase the surface area as well as to assure the provision of a better bond between the member 11 and the polyurethane. In particular, a plurality of openings may be provided in each member 11 so that the polyurethane will flow therethrough during injection molding and upon curing thereof will provide an improved mechanical bond.

This specification has proceeded by referring primarily to polyurethane being injection molded around an associated mounting member 11 to define the blade 10. However, it will be appreciated that any suitable elastomeric material may be used to define the blade 10, such as, for example, a thermoplastic copolymer of urethane or ethylene and one or more comonomers such as ethyl acrylate, vinyl acetate, vinyl acrylate, acrylic acid, and the like.

The improved blade 10 defined by injection molding of the elastomeric material in position around a mounting member 11 is of a typical size used in conventional rotary lawn mowers whereby the comparatively short times of injecting, curing, etc., previously recited are applicable. In particular, a typical blade 10 may range in overall length from roughly 18 to 22 inches and have a typical mounting member ranging between 8 and 13 inches in length respectively. The width of each typical mounting member is roughly 2 inches and the thickness of each member is roughly .156 inch. An average thickness of a typical arm 13 measured through the inner portion 15 thereof is roughly ¼ inch and the maximum width of such blade may range between slightly greater than 2 inches to 2½ inches.

While present exemplary embodiments of this invention, and methods of practicing the same, have been illustrated and described, it will be recognized that this invention may be otherwise variously embodied and practiced by those skilled in the art.

What is claimed is:

1. A rotatable blade for a lawn mower comprising a central mounting member and arms extending outwardly from said central member, each arm being comprised of polyurethane fixed around said member by injection molding with each arm having a flexible outer portion provided with an integral cutting edge, said polyurethane having a torsional modulus ranging roughly between $5 \times 10^3$ and $5 \times 10^4$ p.s.i., said member extending outwardly into and being embedded within said arms but terminating inwardly of said cutting edges with said member having surface means providing a better bond between said member and said injection molded polyurethane, said polyurethane containing glass fibers to improve the structural strength of each arm.

2. A blade as set forth in claim 1 in which said glass fibers are substantially uniformly dispersed throughout each arm and define roughly 5 to 25 percent of the weight of each arm.

3. A blade as set forth in claim 1 in which each arm has a base portion molded around an associated end portion of said mounting member with the flexible outer portion of each arm extending beyond the associated terminal end of the mounting member and further comprising a pair of elongated strips having a thickness corresponding to the thickness of said mounting member and extending along opposed side edges of said mounting member and interconnecting said arms.

References Cited

UNITED STATES PATENTS

| | | | |
|---|---|---|---|
| 2,542,871 | 2/1951 | Johnson | 56—28 UX |
| 3,133,398 | 5/1964 | Tatum | 56—295 X |
| 3,389,541 | 6/1968 | Freedlander et al. | 56—295 |
| 3,425,199 | 2/1969 | Freedlander et al. | 56—295 |
| 3,485,022 | 12/1969 | Freedlander et al. | 56—295 |

RUSSELL R. KINSEY, Primary Examiner